United States Patent
Ma

(10) Patent No.: US 11,247,778 B2
(45) Date of Patent: *Feb. 15, 2022

(54) TRANSFERRING INFORMATION BETWEEN A VEHICLE BASED USER DEVICE AND A SERVER TO VALIDATE USER INFORMATION BEFORE GRANTING INTERNET ACCESS

(71) Applicant: Thales Avionics, Inc., Irvine, CA (US)

(72) Inventor: Jueren Ma, Placentia, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/900,121

(22) Filed: Jun. 12, 2020

(65) Prior Publication Data

US 2020/0298975 A1 Sep. 24, 2020

Related U.S. Application Data

(63) Continuation of application No. 16/242,530, filed on Jan. 8, 2019, now Pat. No. 10,710,723.

(51) Int. Cl.
*H04L 29/08* (2006.01)
*B64D 11/00* (2006.01)
(Continued)

(52) U.S. Cl.
CPC ..... *B64D 11/0015* (2013.01); *H04B 7/18506* (2013.01); *H04L 61/2007* (2013.01);
(Continued)

(58) Field of Classification Search
CPC .......................... H04L 61/2007; H04L 63/067
See application file for complete search history.

(56) References Cited

U.S. PATENT DOCUMENTS 6,807,538 B1 10/2004 Weinberger et al.
2003/0217363 A1* 11/2003 Brady, Jr. ............... H04L 29/06
725/76
(Continued)

FOREIGN PATENT DOCUMENTS

WO 2005120069 A2 12/2005

OTHER PUBLICATIONS

International Search Report and Written Opinion of the International Searching Authority for PCT Application No. PCT/US20/12457 dated Mar. 25, 2020.

*Primary Examiner* — Adnan M Mirza
(74) *Attorney, Agent, or Firm* — Sage Patent Group

(57) ABSTRACT

An entertainment and connectivity system includes a processor for transferring information between a vehicle based user device and a server to validate a user's government identity before granting the user device access to the internet. The vehicle based server has an internet protocol address and communicates with user devices. The user devices each have an onboard internet protocol address mapped to the internet protocol address of the vehicle based server. A processor associated with the vehicle based server receives requests for internet service originating from the user devices. The requests include travel information or internet subscription plan information for a user of each of the user devices. The vehicle based server, or a ground based server that receives the request, generates an internet connection authorization decision based on validation of the user's government identity or the user's internet subscription plan information. The connection authorization decisions are then used to control whether the internet connections are established to the user devices. If the internet connections are established, internet session information for the user devices, including for each user device the onboard internet protocol address mapped to the internet protocol address of
(Continued)

the vehicle based server, is stored in a ground based server and can be retrieved to identify the government identity of a user or a user's internet subscription plan information for each of the user devices.

18 Claims, 8 Drawing Sheets

(51) Int. Cl.
| | |
|---|---|
| *H04B 7/185* | (2006.01) |
| *H04L 29/12* | (2006.01) |
| *H04W 12/08* | (2021.01) |
| *H04W 4/42* | (2018.01) |
| *H04W 76/11* | (2018.01) |
| *H04W 48/18* | (2009.01) |
| *H04L 29/06* | (2006.01) |
| *H04W 4/48* | (2018.01) |
| *H04W 68/00* | (2009.01) |

(52) U.S. Cl.
CPC ........ *H04L 63/067* (2013.01); *H04L 63/0807* (2013.01); *H04W 4/42* (2018.02); *H04W 4/48* (2018.02); *H04W 12/08* (2013.01); *H04W 48/18* (2013.01); *H04W 76/11* (2018.02); *H04W 68/00* (2013.01)

(56) References Cited

U.S. PATENT DOCUMENTS

2011/0320576 A1* 12/2011 Lauer ................ H04B 7/18506
 709/220
2018/0075717 A1   3/2018 Reinbold et al.
2018/0270607 A1   9/2018 Niles

* cited by examiner

TRANSFERRING INFORMATION BETWEEN A VEHICLE BASED USER DEVICE AND A SERVER TO VALIDATE USER INFORMATION BEFORE GRANTING INTERNET ACCESS

CROSS REFERENCE TO RELATED APPLICATION

This application is a continuation of U.S. patent application Ser. No. 16/242,530 filed on Jan. 8, 2019, the disclosure and content of which is incorporated by reference herein in its entirety.

FIELD OF THE INVENTION

The present disclosure relates to systems for transferring information between a vehicle based user device and a server to validate a user's identity before granting internet access to the user device.

BACKGROUND

In-flight entertainment and connectivity (IFE or entertainment) systems have been deployed onboard aircraft to provide entertainment, such as internet access, movies, television, audio entertainment programming, electronic games, and other electronic content to passengers. IFE systems are increasingly using wireless devices that can be operated by passengers to display content from the internet. Such user devices can include passenger electronic devices (PEDs) that are transported onto the aircraft by the passengers and seat video display units (SVDUs) that may be in communication with passenger control units (PCUs) supplied as aircraft equipment. Such PEDs can include cellular phones, tablet computers, laptop computers, wireless headphones, etc. Passengers can operate the user devices to connect to the internet and select internet content for playback or display through the user devices.

Some government regulations require verification of the identity of a person prior to granting internet access to that person. For example, Chinese regulations require that Internet Service Providers (ISPs) collect government issued identification information of an individual (e.g., passport number, full name, address, date of birth, etc.) before internet service can be provided to the individual. In China, for example, an ISP manually collects the individual's government issued identification information, validates the information (e.g., by manually inspecting the government identification document), and manually inputs validation of the individual's government identification into the ISP's system. This process, however, is not feasible inside an aircraft or other vehicle.

SUMMARY

Some embodiments of the present disclosure are directed to an entertainment system for an aircraft that includes a server on the aircraft that can establish internet connections with user devices responsive to validation of the identity of or an internet subscription plan of a user of the user device. The server has an internet protocol address and communicates with user devices. The user devices are assigned unique internet protocol addresses that are mapped to the internet protocol address of the server. A processor associated with the server receives requests for internet service originating from the user devices. The requests include travel information or internet subscription plan information associated with a user of each of the user devices. From the information included in the request, a ground based server that receives the request from the aircraft based server, generates an internet connection authorization decision based on validation of the user's identity or the user's internet subscription plan. The connection authorization decisions are then used to control whether the internet connections are established to the user devices. Internet session information for the internet connections associated with session tokens for the assigned internet protocol addresses of the user devices are stored in a ground based server and can be retrieved to identify the users or the users' internet subscription plan information for the user devices while they were connected to the internet.

Other embodiments of the present disclosure are directed to an entertainment system for an aircraft that includes a server on an aircraft that can establish internet connections with user devices responsive to validation of the identity of or an internet subscription plan of a user of the user device. The server has an internet protocol address and communicates with user devices. The user devices are assigned unique internet protocol addresses that are mapped to the internet protocol address of the server. A processor associated with the server receives requests for internet service originating from the user devices. The requests include travel information or internet subscription plan information associated with a user of each of the user devices. From the information included in the request, the server generates an internet connection authorization decision based on validation of the user's identity or the user's internet subscription plan. The connection authorization decisions are then used to control whether the internet connections are established to the user devices. Internet session information for the internet connections associated with session tokens for the assigned internet protocol addresses of the user devices are stored in a ground based server and can be retrieved to identify the users or the users' internet subscription plan information for the user devices while they were connected to the internet.

Other embodiments of the present disclosure are directed to an entertainment system for an aircraft that includes a server on an aircraft that can establish internet connections with user devices responsive to validation of the identity of or an internet subscription plan of a user of the user device. The aircraft based server has an internet protocol address and communicates with user devices. The user devices are assigned unique internet protocol addresses that are mapped to the internet protocol address of the aircraft based server. A processor associated with the aircraft based server receives requests for internet service originating from the user devices. The requests include travel information or internet subscription plan information associated with a user of each of the user devices. The aircraft based server communicates the requests received from the user devices to a first ground based server. The aircraft based server receives an internet connection authorization decision from the first ground based server based on validation of the user's identity or the user's internet subscription plan. When the connection is authorized, the aircraft based server generates a session token. The connection authorization decisions are then used to control whether the internet connections are established to the user devices. Internet session information for the internet connections associated with session tokens for the assigned internet protocol addresses of the user devices are stored in a ground based server and can be retrieved to identify the users or the users' internet subscription plan information for the user devices while they were connected to the internet.

Some embodiments of the present disclosure are directed to an entertainment system for a vehicle that includes a server on the vehicle that can establish internet connections with user devices responsive to validation of the identity of or an internet subscription plan of a user of the user device. The server has an internet protocol address and communicates with user devices. The user devices are assigned unique internet protocol addresses that are mapped to the internet protocol address of the server. A processor associated with the server receives requests for internet service originating from the user devices. The requests include travel information or internet subscription plan information associated with a user of each of the user devices. From the information included in the request, a ground based server that receives the request from the vehicle based server, generates an internet connection authorization decision based on validation of the user's identity or the user's internet subscription plan. The connection authorization decisions are then used to control whether the internet connections are established to the user devices. Internet session information for the internet connections associated with session tokens for the assigned internet protocol addresses of the user devices are stored in a ground based server and can be retrieved to identify the users or the users' internet subscription plan information for the user devices while they were connected to the internet.

Some embodiments of the present disclosure are directed to a ground based server that can retrieve user identity or internet subscription plan information for user devices that were connected to the internet while located in a vehicle. The ground based server includes a repository that stores internet session information for user devices having onboard internet protocol addresses mapped to an internet protocol address for a vehicle based server. The ground based server includes a processor that receives requests from a second server for the identity of users of the user devices having the onboard internet protocol addresses mapped to an internet protocol address for the vehicle based server. From the information in the request, the ground based server retrieves the user identities or the users' internet subscription plan information for the identified user devices. The ground based server communicates the user identities or the users' internet subscription plan information to the second server.

Other systems, servers, processors and/or corresponding methods according to embodiments of the inventive subject matter will be or become apparent to one with skill in the art upon review of the following drawings and detailed description. It is intended that all such additional systems, servers, processors and/or corresponding methods be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
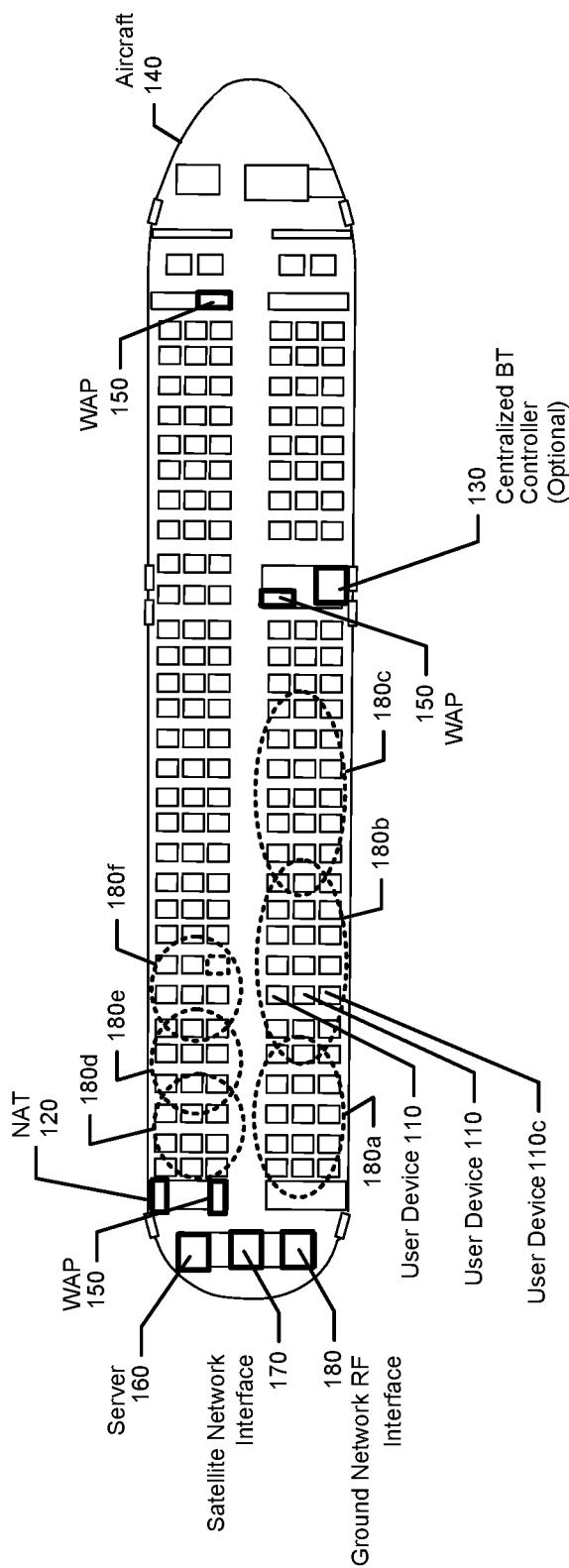
FIG. 1 illustrates an aircraft cabin containing an IFE, system having a server that transfers data with user devices to validate a passenger's identity or internet subscription plan before granting the internet access to a passenger's user device, in accordance with some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to innovative ways for transferring information between a user device, a ground based computer server and/or an aircraft based or other vehicle based computer server to validate a user's identity or internet subscription plan before granting internet access to a user's user device. Although embodiments herein are primarily described in the context of transferring data to and/or from an aircraft based server that is part of an IFE system deployed onboard an aircraft, the invention is not limited thereto. Instead, these and other related embodiments may be used to transfer data to and/or from servers located in other types of vehicles, including without limitation, trains, automobiles, cruise ships, and buses.

Various embodiments are explained below in the non-limiting context of validating a user's identity using travel information of the user. Although embodiments herein are primarily described in the context of travel information for airline flights, the travel information is not limited thereto. Instead, these and other related embodiments may be used for travel information associated with other types of vehicles, including without limitation, trains, automobiles, cruise ships, and buses.

Various embodiments of the present disclosure are explained below in the non-limiting context of validating the identity of passengers using user devices before granting the user devices access to the internet. Although embodiments herein are primarily described in the context of passengers of a vehicle, the invention is not so limited. The passengers include crew members and other representatives of the vehicle operators, including without limitation, employees and representatives of airline, train, automobile, cruise ship, and bus operators.

Various embodiments are explained below in the non-limiting context of an IFE system that includes user devices. The user devices include passenger electronic devices (PEDs) and seat video display units (SVDUs) that may be mounted to structures within the aircraft, including to seatbacks, seat armrests/frames, bulkheads, overhead structures etc. and communicate through Bluetooth connections with user terminals, which are also referred to as passenger control units (PCUs) and passenger electronic devices (PEDs). The PEDs can be transported onto the aircraft by the passengers and include mobile phones, tablet computers, laptop computers, wireless Bluetooth headphones, etc. The PCUs can be supplied as aircraft or vehicle equipment. The user terminals and SVDUs each include Bluetooth transceivers that are configured to transmit and receive radio frequency (RF) signals, such as in the ISM band.

FIG. 1 illustrates an aircraft fuselage 140 containing an IFE system that provides entertainment services and connections to passengers. The IFE system can include a server 160 that can stream and/or download electronic content from the internet through wired networks (e.g., Ethernet) and/or through wireless access points (WAPs) 150 to user devices 110, including PEDs that are transported by passengers and/or crew members onboard and off the aircraft 140. The server 160 may additionally stream and/or download electronic content from the internet through WAPs 150 to seat video display units (SVDUs) 110c. Server 160 has a unique internet protocol (IP) address assigned to it by an internet service provider (ISP) for internet services provided onboard the aircraft. The IP address for server 160 is stored in the ISP's ground system, including an association between the IP address for server 160, the tail number of the aircraft 140 and the identity of the airline operating the aircraft 140 on which server 160 is installed. A network translation router (NAT) 120 is configured to route communication packets between a user device 110, server 160 and/or a ground based server 190. The network translation router 120 assigns a unique onboard IP address to each user device 110 onboard the aircraft 140, and maps each IP address to the IP address for the aircraft 140, as further disclosed in more detail below.

Passengers may be provided internet services to the user devices 110 through aircraft based server 160. The server 160 may be communicatively connected to the user devices 110 through a wired data network (e.g., Ethernet cabling and electronic network interfaces) and/or a wireless data network. An example wireless data network is described in FIG. 1 that includes a plurality of WAPs 150 that are installed (mounted) at spaced apart locations within the aircraft 140 fuselage to provide corresponding wireless communication cells. The WAPs 150 communicate through a wireless air interface that can be based on one or more communication protocols including, without limitation, any one or more of IEEE 802.11, WIMAX, 3GPP Long Term Evolution (LTE), etc.

The user devices 110 can include, without limitation, tablet computers, laptop computers, palmtop computers, cellular smart phones, media players, SVDUs, etc. When owned by a passenger, a user device 110 can also be referred to as a passenger electronic device (PED). Each of the user devices 110 is assigned a unique onboard IP address by NAT 120 that is used for routing communications through the IFE system and to ground based servers.

Some or all of the seats of the aircraft 140 may be associated with a docking station may have a wired interface. An SVDU 110c facing the seat includes a processor that is connected to communicate through a Bluetooth transceiver and through the wired interface of the docking station. A PCU can include a processor connected to communicate through a wired interface and to communicate through a Bluetooth transceiver. The PCU may be configured to be releasably docked in the docking station to communicatively connect the wired interfaces of the PCU and the docking station. While docked in the docking station the processor of the PCU and the processor of the SVDU are configured to communicate through the wired interfaces of the PCU and the docking station to establish a Bluetooth connection between the Bluetooth transceivers of the PCU and the SVDU. The processor of the PCU may be configured to not operate to establish the Bluetooth connection using communications through the Bluetooth transceiver of the PCU while docked in the docking station. Accordingly, a Bluetooth connection between a pair of Bluetooth transceivers in a PCU and a SVDU 110c can be establish through wired communications via the docking station, and subsequent communications while the Bluetooth connection is maintained (e.g., unrelated to establishing the Bluetooth connection) are then performed through the Bluetooth transceivers.

Figure 2:
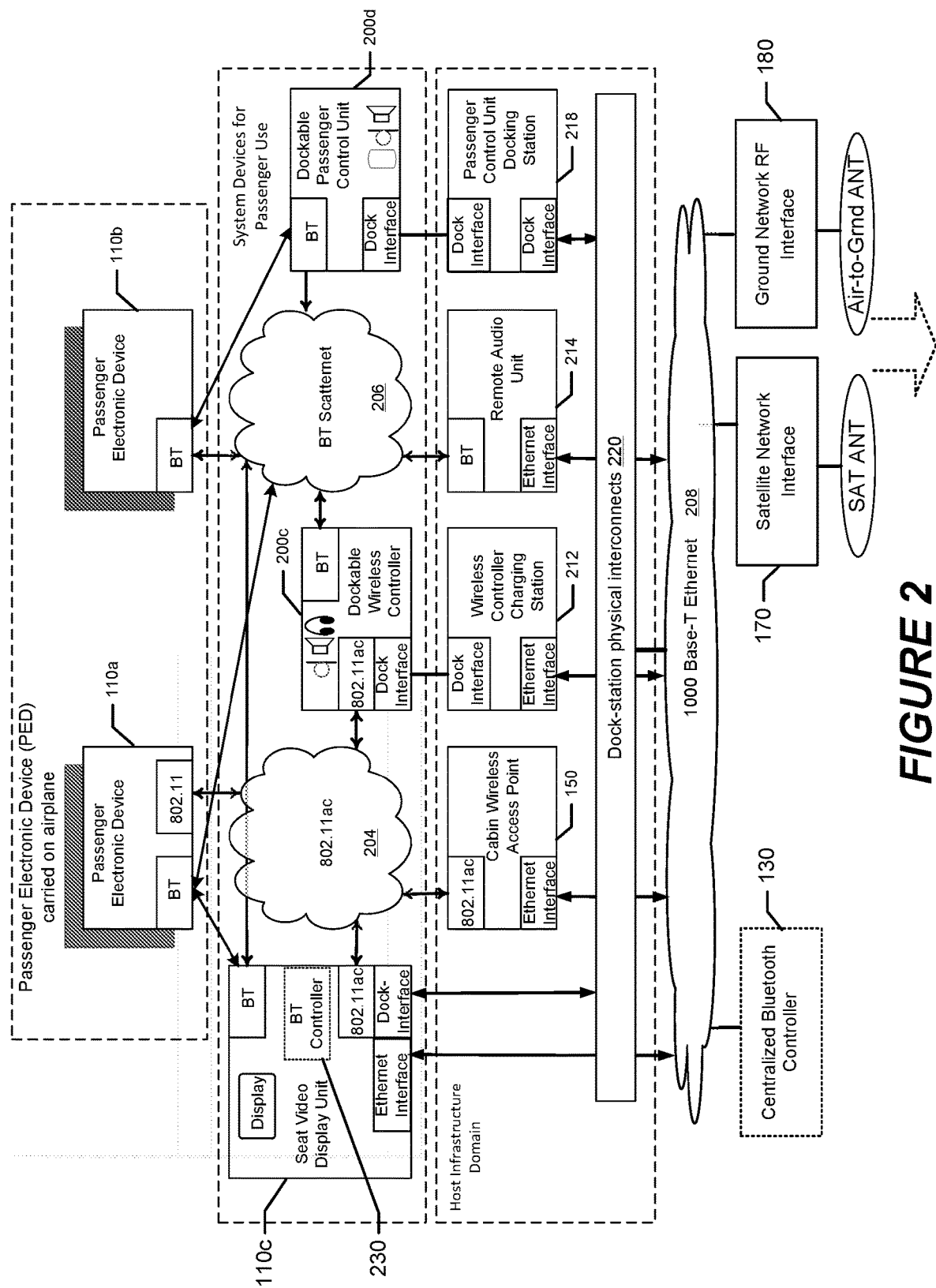
FIG. 2 is a block diagram illustrating the IFE system of FIG. 1 having elements that are configured to operate in accordance with some embodiments of the present disclosure.

Referring to FIGS. 1 and 2, in accordance with various present embodiments, the system includes a central Bluetooth connection controller 220 that is communicatively connected to the SVDUs 110c through a wired network, such as Ethernet, and/or through the WAPs 150 via a wireless network such as WiFi 802.11. The central Bluetooth connection controller 220 is configured to control setup, maintenance, and/or termination of Bluetooth connections between the SVDUs 110c and the PCUs.

The aircraft 140 may also include a satellite link interface 170 that is configured to provide wireless data communications through a satellite communication system and/or through direct aircraft-to-ground communication links. The satellite data link interface 170 may be any satellite connectivity system that provides data communications capabilities for aircraft within range of satellite based communications network equipment, using radio transceiver circuits located onboard the aircraft. The wireless communications may be performed using IEEE 802.11, WIMAX, and/or 3GPP LTE technologies, etc. A communication link can be established, for example, between the aircraft based server 160 and a ground based server 190 via the satellite network.

The aircraft 140 may also include a ground data link interface 180 that is configured to provide wireless data communications through a satellite communication system and/or through direct aircraft-to-ground communication links. The ground data link interface 180 may be any ground connectivity system that provides data communications capabilities for aircraft within range of ground based communications network equipment located at airports, using radio transceiver circuits located onboard the aircraft and at airports (e.g., at gate locations). The wireless communications may be performed using IEEE 802.11, WIMAX, and/or 3GPP LTE technologies, etc. The aircraft can be recognized by the ground network when it arrives at an airport or gate, and a communication link can be established between the aircraft based server 160 and a ground based server 190 via the ground network.

FIG. 2 is a block diagram of the IFE system of FIG. 1 having elements that are configured to operate in accordance with some embodiments of the present disclosure. Referring to FIG. 2, the IFE system includes system devices that can be located at each passenger seat location, and which is configured to communicate with various types of user devices that can be provided by the airline and/or carried on-board by passengers. The seat-located system devices can communicate using RF resources within the ISM band with the PCUs using a Bluetooth (BT) scatternet wireless network 206 and may use an IEEE 802.11ac wireless network 204. The example user devices include PEDs 110a having both a Bluetooth transceiver and a IEEE 802.11 (WiFi) transceiver and other user devices 110b having a Bluetooth transceiver.

The system devices can include a SVDU 110c, a dockable wireless controller 200c, and a dockable PCU 200d. The system may include only one or both of the dockable wireless controller 200c and the dockable passenger control unit 200d, which may be the same or similar type of device or may be different types of devices, and which can be collectively referred to as wireless controllers. The dockable wireless controller 200c and the dockable PCU 200d can be operated by a passenger to wirelessly control the SVDU 110c, such as to select internet content that is consumed (e.g., played through a display device), select among menu items, and control other operations of the SVDU 110c. Audio content may be streamed through the Bluetooth connection from the SVDU 110c to a user device, e.g., Bluetooth headphones. Pictures, video, textual information, and/or commands may be communicated from the SVDU 110c to a user device through the Bluetooth connection.

The example SVDU 110c includes a display device, video display circuitry, a general-purpose processor, a Bluetooth transceiver, and an Ethernet interface or other wired network interface. The dockable wireless controller 200c includes a general-purpose processor, a Bluetooth transceiver, and a dock wired interface, and may include display circuitry connected to a display device, and audio decoding circuitry connected to a wired headphone jack and/or the Bluetooth transceiver for wireless communication with a passenger's wireless headset. The dockable PCU 200d can similarly include a general-purpose processor, a Bluetooth transceiver, and a dock wired interface, and may include display circuitry connected to a display device, and audio decoding circuitry connected to a wired headphone jack and/or the Bluetooth transceiver for wireless communication with a passenger's wireless headset. The wireless controller 200c, the passenger control unit 200d and dockable passenger control unit 200d, collectively referred to as wireless controller 200, may be configured as handheld devices for operation by passengers and can be stored in docking stations, which may be configured to recharge batteries within the handheld devices. A wireless controller 200 may be a handheld device that is owned by the aircraft operator and provided for temporary use by a passenger during a flight, or may be a PED carried on-board by passengers, such as mobile phones, tablet computers, laptop computers, wireless headphones, etc.

The seat-located system devices are connected to host infrastructure that can include the cabin WAPs 150 spaced apart within the aircraft cabin and mounted to cabin ceiling structures, storage bin structures, bulkheads, etc. An Ethernet backbone network 208, e.g., 1000 Base-T Ethernet, extends throughout the aircraft cabin to communicatively interconnect the seat-located system devices to the server 160 and the WAPs 150. The WAPs 150 can each include an 802.11ac or other WiFi transceiver and an Ethernet interface that connects to the Ethernet backbone network 208.

The host infrastructure can include a PCU docking station 218, a wireless controller charging station 212 (although its functionality may be incorporated into the docking station 218), and a remote audio unit 214. The wireless controller charging station 212 may be located at each seat and have a dock interface that releasably stores the dockable wireless controller 200c and charges a battery therein, and has an Ethernet interface that connects to the Ethernet backbone network 208. The PCU docking station 218 may also be located at each seat and have a dock interface that releasably stores the dockable PCU 200d and charges a battery therein, and has an Ethernet interface that connects to the Ethernet backbone network 208.

The SVDU 110c facing a seat includes a processor that is connected to communicate through a Bluetooth transceiver and through the wired interface of the docking station 218. A wireless controller (PCU) 200 includes a processor connected to communicate through a wired interface and a Bluetooth transceiver. The wireless controller 200 is configured to be releasably docked in the docking station 218 to communicatively connect the wired interfaces of the wireless controller 200 and the docking station 218. While docked in the docking station 218 the processor of the wireless controller 218 and the processor of the display unit 110c may be configured to communicate through the wired interfaces of the wireless controller 200 and the docking station 218, via a dock-station physical interconnects (e.g., wired connections) 220, to establish a Bluetooth connection between the Bluetooth transceivers of the wireless controller 200 and the display unit 110c. The processor of the wireless controller 200 may be configured to not operate to establish the Bluetooth connection using communications through the Bluetooth transceiver of the wireless controller 200. Accordingly, a Bluetooth connection between a pair of Bluetooth transceivers in a wireless controller 200 and a SVDU 110c is establish through wired communications and subsequent communications while the Bluetooth connection is maintained are then performed through the Bluetooth transceivers.

The system further includes the central Bluetooth controller 220 that is communicatively connected to the SVDUs 110c through the Ethernet backbone network 208 and/or through the WiFi 802.11 network 204.

The remote audio unit 214 may be located at each seat or adjacent to a group of seats, and can contain a wired headphone jack, a Bluetooth transceiver, and an Ethernet interface that connects to the Ethernet backbone network 208, to receive and play audio through a loudspeaker and/or through the Bluetooth transceiver and/or the wired headphone jack to a headset worn by one or more passengers.

Some government regulations require verification of the identity of an individual prior to granting internet access to that individual. For example, Chinese regulations require that Internet Service Providers (ISPs) collect government issued identification information of an individual (e.g., passport number, full name, address, date of birth, etc.) before internet service can be provided to the individual. In China, for example, an ISP manually collects an individual's government issued identification information, validates the information (e.g., by manually inspecting the government identification document), and manually inputs verification of the individual's government identification into the ISP's system. This process is not feasible onboard an aircraft.

When a passenger makes a purchase or request to access internet service while onboard an aircraft, a representative of the ISP for the aircraft's internet service is not onboard the aircraft to validate the passenger's identity. Additionally, when a passenger makes a request to access the internet, the relationship between the passenger's identity and identifying information of the passenger's user device (e.g., IP address) is not known to the ISP for the aircraft. In the absence of validation of that relationship, internet access cannot be granted. For example, a passenger may use a PED carried onboard the aircraft to access the internet over the aircraft's Wi-Fi network or Ethernet. The association between a passenger's identity and the identity of the PED (e.g., mobile phone number, media access control (MAC), Internet Protocol (IP) address for the PED, etc.), however, is not known to the ISP for the aircraft. A passenger may also use an SVDU and PCU onboard the aircraft to access the internet over the aircraft's Wi-Fi network or IFE system. However, the association between the passenger's identity and the identity of the aircraft's PCU (e.g., MAC or IP address, etc.) is not known to the ISP providing internet services inside the aircraft. Alternatively, a passenger may have an established internet subscription plan prior to boarding an aircraft. In this circumstance, the association between the passenger identity and the internet subscription is known to the ISP of the subscription plan, but the association is not known to the ISP for the aircraft. For this and other reasons, various embodiments disclosed herein are directed to transferring information among a user device 110, a ground based computer server 190, and/or an aircraft based or other vehicle based computer server 160 to validate a user's identity or internet subscription plan before granting a user device 110 of the user access to the internet.

Figure 3:
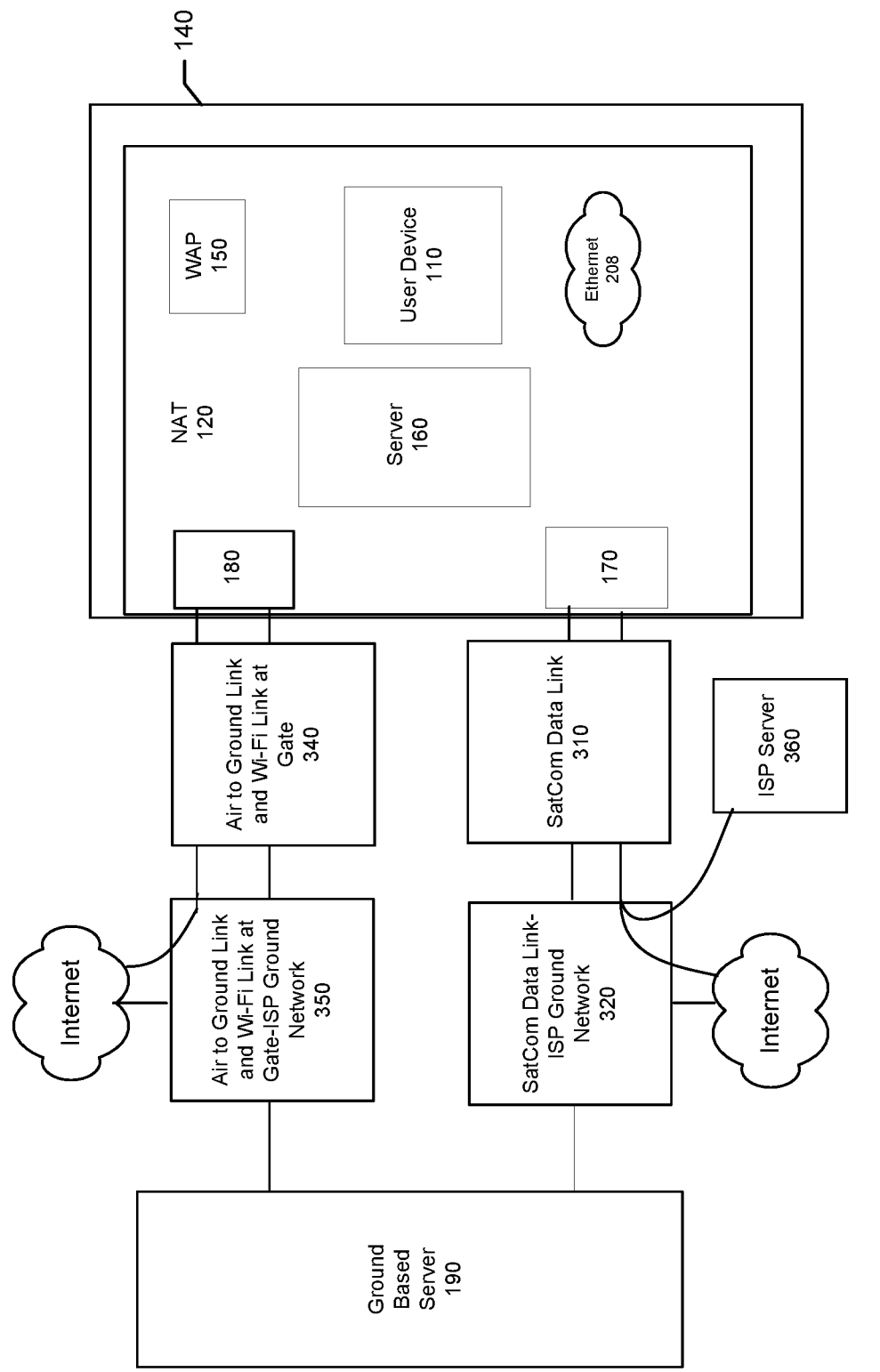
FIG. 3 is a block diagram illustrating operational components of an aircraft based IFE system, satellite communication links, air-to-ground communication links, and a ground based server, in accordance with some embodiments of the present disclosure.

FIG. 3 is a block diagram illustrating operational components of an aircraft based IFE system, satellite communication links, air-to-ground communication links, and ground based servers in accordance with some embodiments of the present disclosure. Referring to FIG. 3, when a passenger buys a flight ticket, the passenger is required to provide government identification information. The government identification ("government identity") information may identify any one or more of: passport number, name, home mailing address, birth date, telephone number, government issued identifier for the person, etc. Passenger travel information for the purchased flight and the government identification information is stored with a logical association to each other in a data structure of a database, such as an airline ground based server 190. The passenger travel information ("travel information") may identify any one or more of: passenger name, flight number, passenger ticket number, airline frequent flyer membership information, etc.

Referring to FIGS. 1 and 3, in one embodiment, after the passenger boards the aircraft, the passenger operates a user device 110 to connect to the onboard IFE system through WAP 150 or the Ethernet. A network address translation router 120 assigns a unique onboard IP address to the user device 110 for the duration of the flight. The network address translation router 120 is configured to map the assigned onboard IP address of the user device 110 to the ground IP address assigned to server 160. The network address translation router 120 may maintain a mapping table that programmatically associates the onboard IP addresses for each user device 110 with the ground IP address assigned to server 160. As a result, each user device 110 is uniquely identified by the aircraft ISP's ground network IP address during the time period that each user device 110 accesses the internet during the flight.

A passenger operates a user device 110 having an assigned onboard IP address to request access to the internet. The request includes passenger travel information for the purchased flight and a request to access the internet. The travel information and the request for internet service may be communicated to server 160 in one or separate messages and is collectively referred to herein as a request. Server 160 communicates the request to the ground based server 190 via satellite communications network interface 170 and satellite communications links 310 and 320 or via ground network interface 180 and air-to-ground communication links 340 and 350.

Responsive to the request, ground based server 190 generates a connection authorization decision. More particularly, ground based server 190 receives the request and uses the passenger's travel information to validate the passenger's identity stored in server 190. The ground based server 190 is configured to correlate the passenger's travel information to the passenger's government identity information. The server 190 may maintain a mapping table that programmatically associates the passenger's travel information to the passenger's government identity information. In some embodiments, to protect the security of the passenger's government identity information, ground server 190 does not communicate the passenger's identity to the aircraft 140. Responsive to the request, if a passenger's government identity information is missing or otherwise not validated by server 190, ground based server 190 generates a connection authorization decision to deny the passenger's user device 110 access to the internet. Responsive to the request, if the passenger's government identity information is validated by ground server 190, ground based server 190 generates a connection authorization decision to grant the passenger's user device 110 access to the internet and generates a unique internet session token. Ground based server 190 communicates the connection authorization decision and token to server 160 via satellite communications links 310 and 320 and satellite interface 170. Alternatively, ground based server 190 communicates the connection authorization decision and token to server 160 via ground communication links 340 and 350 and air-to-ground interface 180. The connection authorization decision includes the assigned onboard IP address for the user device 110. The network address translation router 120 routes the connection authorization decision through server 160 to the user device 110. When the connection authorization decision authorizes a connection to the internet for the user device 110, server 160 is configured to connect user device 110 to the internet through the onboard Ethernet or through WAP 150. Server 160 is configured to monitor and collect internet session information of the user device 110, including but not limited to the unique session token associated with the assigned onboard IP address of the user device 110, as further explained below.

In other embodiments, when a passenger operates a user device 110 to request access to the internet, a vehicle based server performs the validation and generates a connection authorization decision, as explained in further detail below with reference to FIG. 7.

Figure 4:
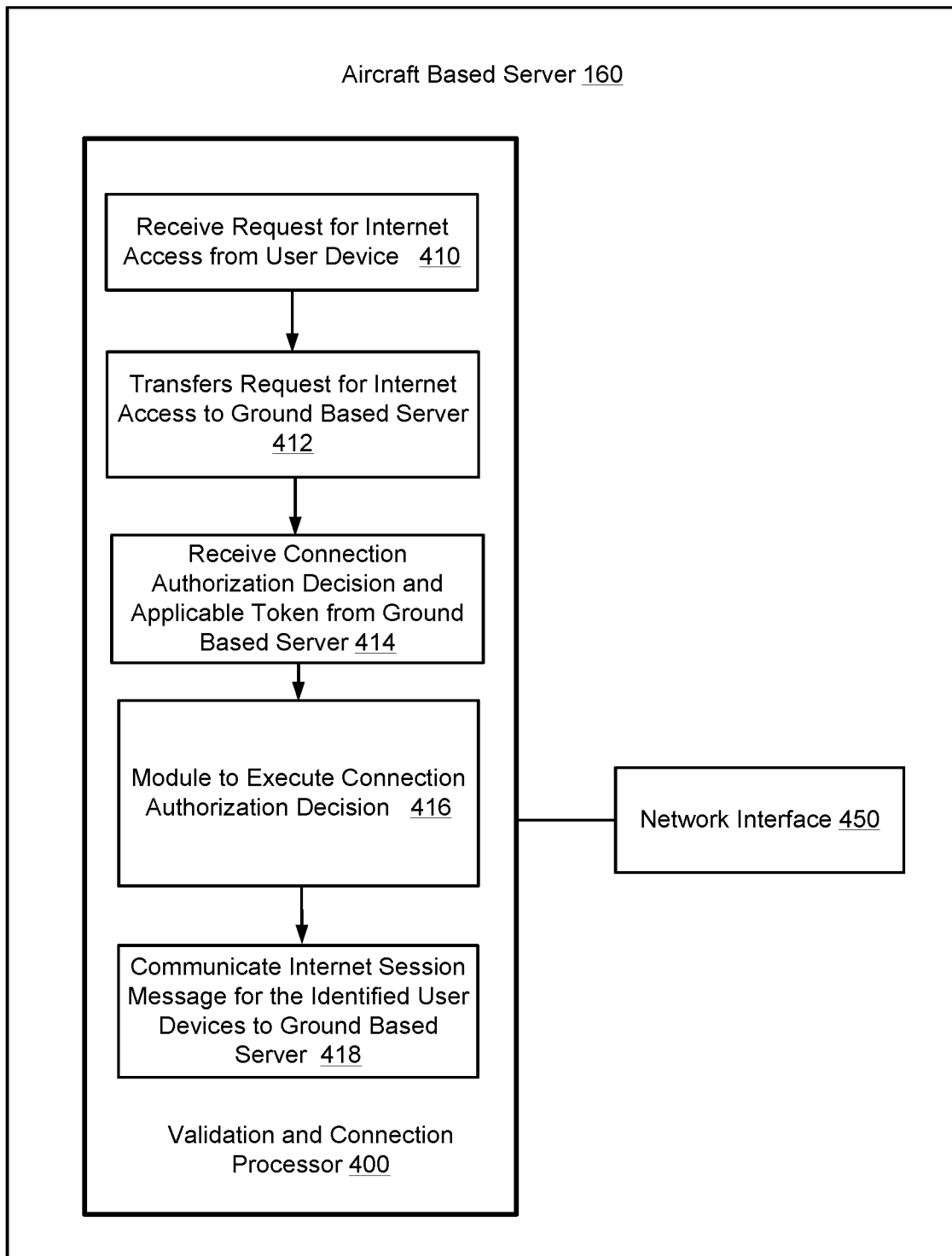
FIG. 4 is a block diagram of operational components of the aircraft based server of FIG. 1 that processes and transfer data with the ground based server and user devices of FIG. 1, in accordance with some embodiments of the present disclosure.

FIG. 4 is a block diagram of operational components of the aircraft based server 160 of FIGS. 1 and 3 that processes and transfers data between a user device 110, a ground based server 190, and/or an aircraft based server 160 in accordance with some embodiments of the present disclosure.

Referring to FIGS. 1-4, after a passenger boards aircraft 140, the passenger operates a user device 110 having a unique onboard IP address assigned by network address translator 120 to make a request for internet access. The aircraft based server 160 receives the request (block 410) from the user device 110, which includes the onboard IP address assigned to user device 110. The server 160 may communicate via network interface 450 and wired connections to some onboard user devices 110 and/or wireless connections to other onboard user devices 110. Wired communication links may be established using network interfaces (e.g., USB ports) located at passenger seats, which may be connected to seat video display units 110c at each seat location. Wireless communication links may be established through WAPs 150. Some user devices may wirelessly communicate directly with the WAPs 150. Some other user devices 110 may wirelessly communicate indirectly with the WAPs 150 via seat video display units 110c which relay communications directly between those user devices 100 and the WAPs 150. Still some other user devices may communicate through wired connections to the seat video display units 110c (e.g., via USB ports) which relay data through wireless links with the WAPs 150.

In one embodiment, the aircraft based server 160 transfers the request (block 412) through the aircraft satellite data interface 180 to ground based server 190 via satellite communications links 310 and 320. Alternatively, the aircraft based server 160 communicates (block 412) the request through an aircraft air-to-ground data interface 180 to ground based server 190 via air-to-ground communications links 340 and 350.

Continuing with FIG. 4, in further operations, the aircraft based server 160 receives a connection authorization decision (block 414) from ground based server 190 denying or authorizing internet access to user device 110 and provides an applicable token based on server 190's validation of the user's government identity. When the server 190 is unable to validate the user's government identity, the connection authorization decision denies internet access to user device 110. Server 160 is configured to deny a connection between the user device 110 and the internet. When server 190 is able to validate the user's government identity, the connection authorization decision authorizes internet access to the user device 110. Server 160 is configured to connect (block 418) the user device 110 to the internet through a WAP(s) 150 or through a wired connection. When the internet connection is authorized, ground based server 190 communicates (block 414) to server 160 a unique internet session token for the user device 110 for associating internet session information of the user device 110 with the assigned onboard IP address for the user device 110. While the user device 110 is connected to the internet, server 160 communicates (block 418) an internet session message for the user device 110 to ground based server 190. The internet session message may include, but is not limited to, one or more of a media access control address (MAC) address for the user device 110, the assigned onboard IP address for the user device 110 mapped to the ground IP address of the vehicle based server, internet session start and termination time in Coordinated Universal Time (UTC) for the user device 110, and/or the unique session token shared between server 160 and ground based server 190 for user device 110.

Figure 5:
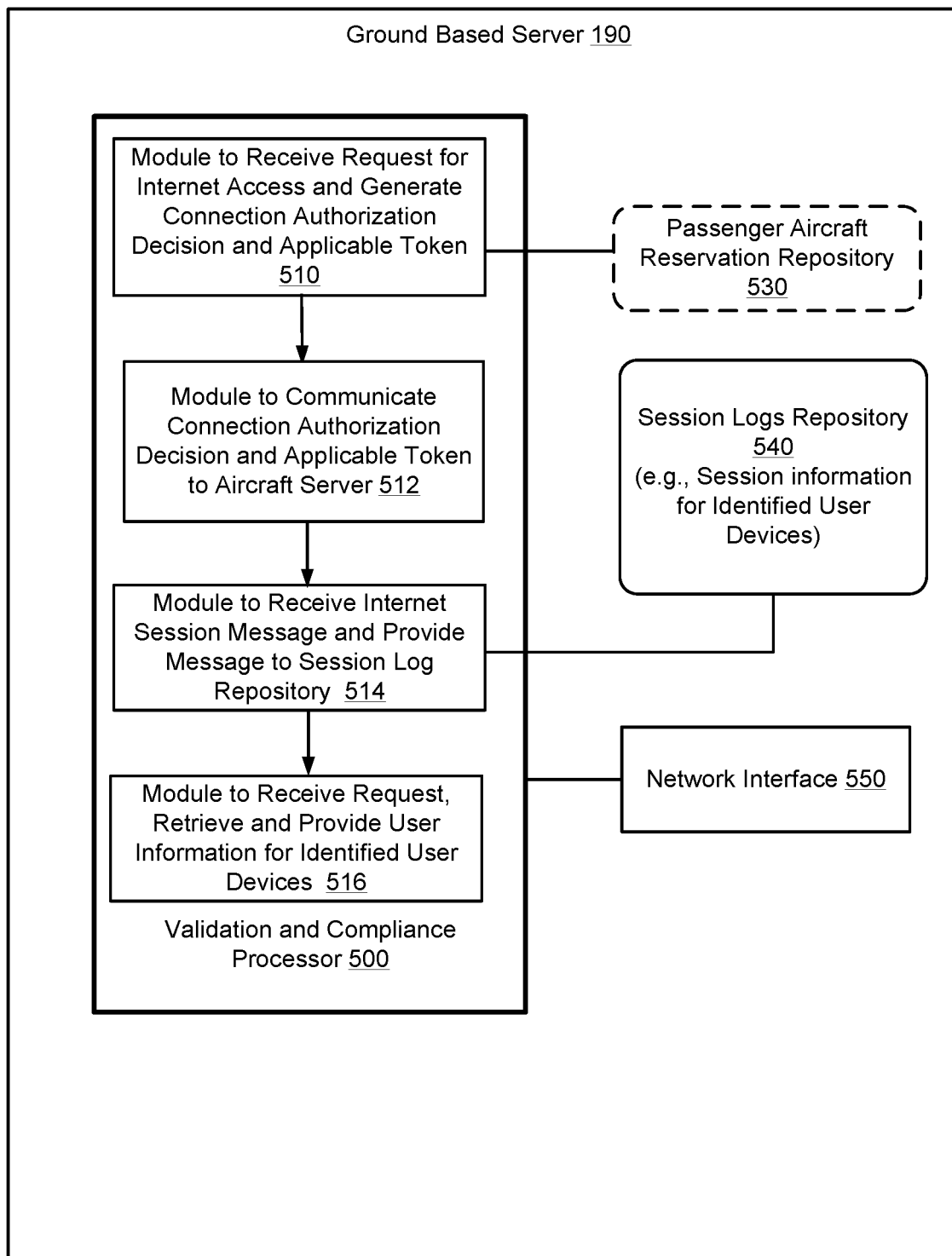
FIG. 5 is a block diagram of operational components of the ground based server of FIG. 1 that processes and transfers data between a user device and an aircraft based server in accordance with some embodiments of the present disclosure.

FIG. 5 is a block diagram of operational components of the ground based server 190 of FIG. 1 that generates connection authorization decisions, generates the session information token used to uniquely identify session information for a user device 110 when connected to the internet, stores and provides a passenger's government identity and travel information, and stores and provides internet session information for user devices 110 connected to the internet during a flight, in accordance with some embodiments of the present disclosure. Server 190 includes a validation and compliance processor 500, a network interface 550, a session log repository 540, and may include a passenger aircraft reservation repository 530 that will be explained in further detail below.

Referring to FIGS. 1 and 5, server 190 receives a request (block 510) for internet access from a user device 110 having a unique onboard IP address assigned by NAT 120. Responsive to the request, server 190 generates (block 510) a connection authorization decision and a unique session token when the connection is authorized. Ground based server 190 uses passenger travel information from the request to retrieve the passenger's government identity from a passenger aircraft reservation repository 530. Ground based server 190 is configured to validate the passenger's government identity from the correlation between the passenger's travel information and the passenger's government identity information stored in repository 530. The aircraft reservation repository 530 may be included in server 190 or may be a separate repository in communication with server 190. When the passenger's government identity information is successfully retrieved from the passenger aircraft reservation repository 530, ground server 190 generates (block 510) an internet connection authorization decision for the user device 110 that originated the request. When the passenger's government identity is not validated, ground server 190 generates a message denying the request for internet service to the originating user device 110. The connection authorization decision is communicated to server 160 via satellite communications links 310 and 320 and satellite communication interface 170, and from server 160 to user device 110 via the aircraft's Wi-Fi or Ethernet network. If the passenger's government identity is validated, ground based server 190 also generates a unique internet session token (block 510) for user device 110. Ground based server 190 communicates (block 512) the connection authorization decision and applicable token to server 160 via satellite communications links 310 and 320 and satellite communications interface 170. Server 160 is configured to connect the user device 110 to the internet through the aircraft's Wi-Fi network or Ethernet. Server 160 uses the internet session token to associate internet session information with the onboard IP address assigned to user device 110. Alternatively, as shown in FIG. 3, air-to-ground and Wi-Fi communication links 340 and 350 may be used in place of satellite communication link 310 and 320. Server 160 monitors the internet session of user device 110 and generates an internet session message for user device 110 to ground based server 190. Ground based server 190 receives (block 514) the internet session message for user device 110 and stores the message in a session log repository (block 540).

In a further embodiment, as described in more detail below, ground based server 190 receives a request (block 516) to provide the government identity of a user of a user device 110 that was connected to the internet during a flight.

Responsive to the request, ground server 190 accesses the session logs repository 540 and retrieves (block 516) the session information for the identified user device 110. Ground based server 190 is configured to retrieve the government identity of the user of the user device 110. The server 190 may maintain a mapping table that programmatically associates the passenger's validated government identity information to the unique session token for the user device 110.

Figure 6:
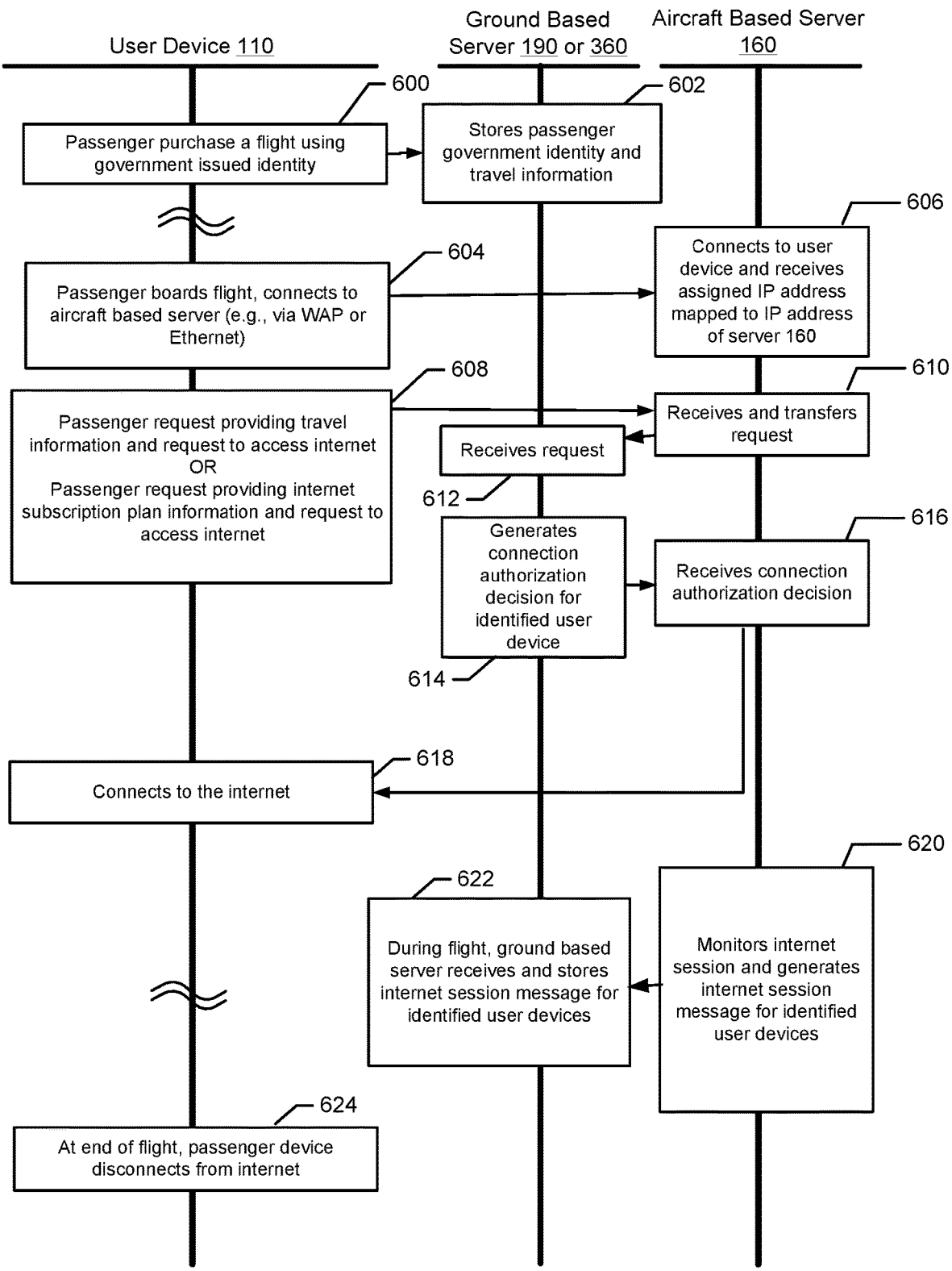
FIG. 6 is a combined flowchart and data flow diagram that illustrates operations and data transfer between a user device, a ground based server, and an aircraft based server in accordance with some embodiments of the present disclosure.

Various further operational embodiments are now described in the context of FIG. 6 which is a combined flowchart and data flow diagram that illustrates operations and data transfers between a user device 110, the aircraft based server 160, and the ground based server 190. In the example embodiment, a passenger purchases a flight using their government issued identity (block 600). During the flight reservation process or separate therefrom (e.g., during a flight check-in process), the reservation system cooperatively identifies the passenger government identity and travel information to ground based server 190, which stores (block 602) the information.

The passenger boards the reserved flight and operates a user device 110 to connect (block 604) to server 160 through the onboard IFE system. Server 160 connects to the user device 110 and receives (block 606) a unique onboard IP address assigned to the user device 110 by the network address translation router 120 for the duration of the flight.

The passenger operates (block 608) the user device 110 to request access to the internet. Server 160 receives (block 610) the request for internet access. Responsive to the request, server 160 transfers (block 610) the request to server 190 to validate the government identity of the passenger. The request is transferred to server 190 through a network connection and/or an off-board communication link that is determined to be available through satellite datalink interface 170 or ground datalink interface 180. The request includes travel information and the assigned onboard IP address for the user device 110 mapped to the IP address for server 160. Server 190 receives (block 612) the request. Responsive to the request, server 190 responds to the request and generates (block 614) a connection authorization decision that includes the assigned onboard IP address for the user device 110 mapped to the IP address for server 160. If the passenger government identity is validated, server 190 provides (block 614) a unique session information token that includes the assigned onboard IP address for the user device 110 mapped to the IP address for server 160. Server 190 communicates (block 614) the connection authorization decision and any provided session information token to server 160. The aircraft based server 160 receives (block 616) the connection authorization decision and any session information token from server 190. Responsive to the connection authorization decision, if the passenger government identification was validated, server 160 is configured to connect (block 618) the user device 110 to the internet via wireless access point 150 or the Ethernet. Responsive to the connection authorization decision, if the passenger's government identity was not, server 160 is configured to deny (block 616) the user device 110 access to the internet.

Continuing reference to FIG. 6, when the user device 110 is connected to the internet, server 160 monitors (block 620) the internet session and generates (block 620) an internet session message for the user device 110 that includes the assigned onboard IP address for the user device 110 mapped to the IP address for server 160. Server 160 communicates (block 620) the internet session message for the user device 110 to ground based server 190, and server 190 receives and stores (block 622) the internet session message for user device 110. At or near the end of the flight, the user device 110 disconnects (block 624) from the aircraft's wireless access point 150 or Ethernet.

In some embodiments, prior to boarding the aircraft 140, a passenger has an established internet subscription plan. In this circumstance, the passenger's government identity was previously validated by the issuer of the internet subscription plan. The association between the government identity of the passenger and the subscription plan, however, is not known to the ISP for the aircraft. Because the passenger's government identity was previously validated by the issuer of the subscription plan, the airline or other vehicle operator need only validate the subscription. With reference to FIGS. 1, 3 and 6, to validate a subscription plan, when a user device 110 requests access to the internet, the request includes internet subscription plan information. The internet subscription plan information may identify any one or more of: internet subscription plan identity, mobile telephone number, login credentials, etc.). The request for access to the internet and the internet subscription plan information can be included in one message or in separate messages and are collectively referred to herein as a request.

Continuing with reference to FIGS. 3 and 6, the passenger boards the reserved flight and operates a user device 110 to connect (block 604) to server 160 through the onboard IFE system. Server 160 connects to the user device 110 and receives (block 606) a unique onboard IP address assigned to the user device 110 by the network address translation router 120 and mapped to the IP address for server 160 for the duration of the flight.

The passenger operates (block 608) the user device 110 to request access to the internet. Server 160 receives (block 610) the request for internet access. Responsive to the request, server 160 transfers (block 610) the request to the ground based server 360 for the ISP of the internet subscription plan to validate the plan. The request is transferred to ground based server 360 through a network connection and/or an off-board communication link that is determined to be available through satellite datalink interface 170 or ground datalink interface 180. The request contains internet subscription plan information and the assigned onboard IP address for the user device 110 mapped to the IP address for server 160. Ground based server 360 receives (block 612) the request. Ground based server 360 generates (block 614) a connection authorization decision for the user device 110 having the unique assigned onboard IP address mapped to the IP address for server 160. Ground based server 360 communicates (block 614) the decision for the identified user device 110 to aircraft based server 160. The aircraft based server 160 receives (block 616) the connection authorization decision including the assigned onboard IP address for the user device 110 mapped to the IP address for server 160. Responsive to the connection authorization decision, if the internet subscription plan was validated, server 160 is configured to connect (block 618) the user device 110 to the internet via wireless access point 150 or the Ethernet. Responsive to the connection authorization decision, if the internet subscription plan was not validated server 160 is configured to deny (block 616) the user device 110 access to the internet. Continuing reference to FIG. 6, when the user device 110 is connected to the internet, server 160 monitors (block 620) the internet session and generates (block 620) an internet session message for the user device 110 including the assigned onboard IP address for the user device 110 mapped to the IP address of server 160. Server 160 communicates (block 620) the internet session message for the user device 110 to ground based server 190. Server 190 receives and stores (block 622) the internet session message for the user device 110 including the assigned onboard IP address for the user device 110 mapped to the IP address for server 160. At or near the end of the flight, the user device 110 disconnects (block 624) from the aircraft's wireless access point 150 or Ethernet.

Referring to FIG. 5, in a further embodiment, ground based server 190 receives a request (block 516) to provide the government identity of a user of a user device 110 that was connected to the internet during a flight. Responsive to the request, ground server 190 accesses the session logs repository 540 and retrieves (block 516) the session information for the identified user device 110. Ground based server 190 is configured to retrieve the internet subscription plan information for the user of the user device 110. The server 190 may maintain a mapping table that programmatically associates the passenger's validated internet subscription plan information to the unique session token for the user device 110.

Continuing with reference to FIG. 5, based on the unique IP address that was assigned to a user device 110 and mapped to the IP address for aircraft server 160, a government or other entity may make a request to the airline and/or the ISP for internet service onboard the aircraft to provide the government identity of a passenger who accessed the internet during a flight. Based on the assigned IP address of the user device 110 mapped to the IP address for the aircraft server 160, the ISP can identify the aircraft tail number (also known as ICAO Registration number) and the airline that owns the tail number. The ISP can provide the airline with the assigned IP address for the user device 110 mapped to the IP address for server 160, the time period in question, the aircraft tail number and/or the flight number. A request (block 516) containing the assigned IP address for the user device 110 mapped to the IP address for server 160, the aircraft tail number and/or the flight number for the time period in question is communicated to ground based server 190. Responsive to the request, server 190 retrieves and provides (block 516) the government identity of the user of the identified user device 110 or the internet subscription plan information for a user of the identified user device 110 from the session log repository 540 for the flight in question.

In some embodiments, the aircraft or other vehicle based server generates the connection authorization decision. FIG. 7 which is a combined flowchart and data flow diagram that illustrates operations and data transfers between a user device 110 and an exemplary aircraft based server 160. In the example embodiment, a passenger purchases a flight using their government issued identity (block 700). During the flight reservation process or separate therefrom (e.g., during a flight check-in process), the reservation system cooperatively identifies the passenger government identity and travel information to aircraft based server 160, which encrypts and stores (block 702) the information to protect security of the passenger government identity information.

Figure 7:
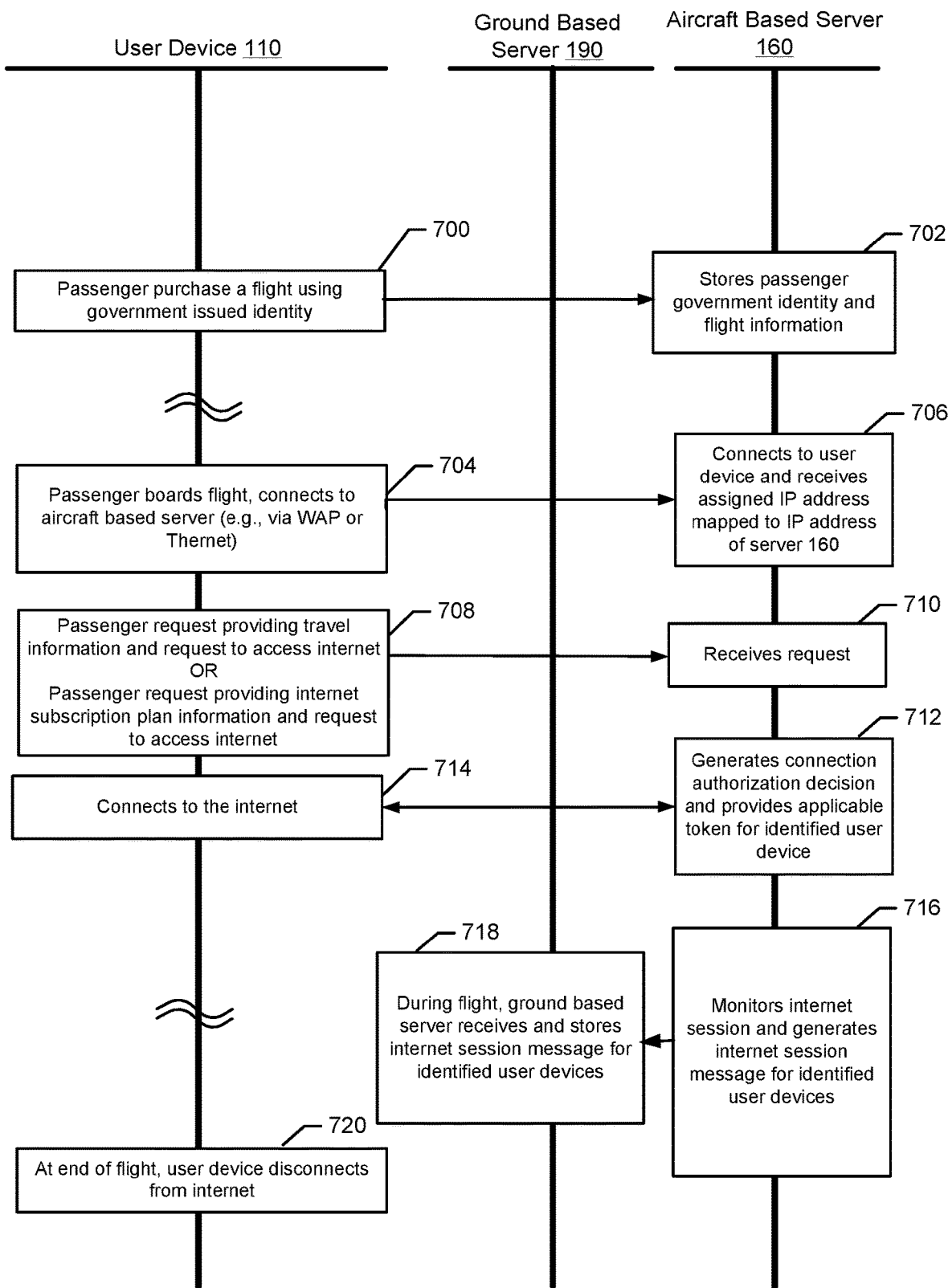
FIG. 7 is a combined flowchart and data flow diagram that illustrates operations and data transfers between a user device, an aircraft based server, and a ground based server in accordance with some embodiments of the present disclosure.

Referring to FIG. 7, the passenger boards the reserved flight and operates a user device 110 to connect (block 704) to server 160 through the onboard IFE system. Server 160 connects to the user device 110 and receives (block 706) a unique onboard IP address assigned to the user device 110 for the duration of the flight by the network address translation router 120 and mapped to the IP address of server 160.

The passenger operates (block 708) the user device 110 to request access to the internet. Server 160 receives (block 710) the request. The request includes travel information and the assigned onboard IP address for the user device 110 mapped to the IP address of server 160. Alternatively, in some embodiments, the request includes internet subscription plan information and the assigned onboard IP address for the user device 110 mapped to the IP address of server 160. The request for access to the internet and travel information or internet subscription plan information can be included in one message or in separate messages and are collectively referred to herein as a request. Responsive to the request, server 160 generates (block 712) a connection authorization decision. More particularly, aircraft based server 160 receives the request and uses the passenger's travel information of internet subscription plan information to validate the passenger's government identity. When the request includes a passenger's travel information, the aircraft based server 160 is configured to correlate the travel information to the passenger's government identity information. The server 160 may maintain a mapping table that programmatically associates the passenger's travel information to the passenger's government identity information.

Continuing with reference to FIGS. 3 and 6, in other embodiments, when the request includes a passenger's internet subscription plan information, the aircraft based server 160 is configured to transfer (block 610) the request to ground based server 360 for the ISP of the internet subscription plan to validate the plan. The request is transferred to ground based server 360 through a network connection and/or an off-board communication link that is determined to be available through satellite communication interface 170 or ground communication interface 180. Ground based server 360 receives (block 612) the request and generates (block 614) a connection authorization decision for the identified user device 110 having the unique onboard IP address mapped to the IP address of server 160. Ground based server 360 communicates (block 614) the decision for the identified user device 110 to the aircraft based server 160. The aircraft based server 160 receives (block 616) the connection authorization decision including the assigned IP address for user device 110 mapped to the IP address of server 160.

Continuing with reference to FIG. 7, responsive to the connection authorization decision, if the passenger government identity or internet subscription plan information is validated, a unique session information token associated with the assigned onboard IP address for the user device 110 mapped to the IP address of server 160. If the passenger government identification or internet subscription plan was validated, server 160 is configured to connect (block 714) the user device 110 to the internet via wireless access point 150 or the Ethernet. Responsive to the connection authorization decision, if the passenger's identity was not validated, server 160 is configured to deny (block 712) the user device 110 access to the internet.

Continuing reference to FIG. 7, when the user device 110 is connected to the internet, server 160 monitors (block 716) the internet session and generates (block 716) an internet session message containing internet session information for user device 110 having an assigned onboard IP address mapped to the IP address of server 160. Server 160 communicates (block 716) the internet session message for the user device 110 to ground based server 190, and server 190 receives and stores (block 718) the internet session message for user device 110 including the assigned onboard IP address mapped to the IP address of server 160. At or near the end of the flight, the user device 110 disconnects (block 720) from the aircraft's wireless access point 150 or Ethernet.

Figure 8:
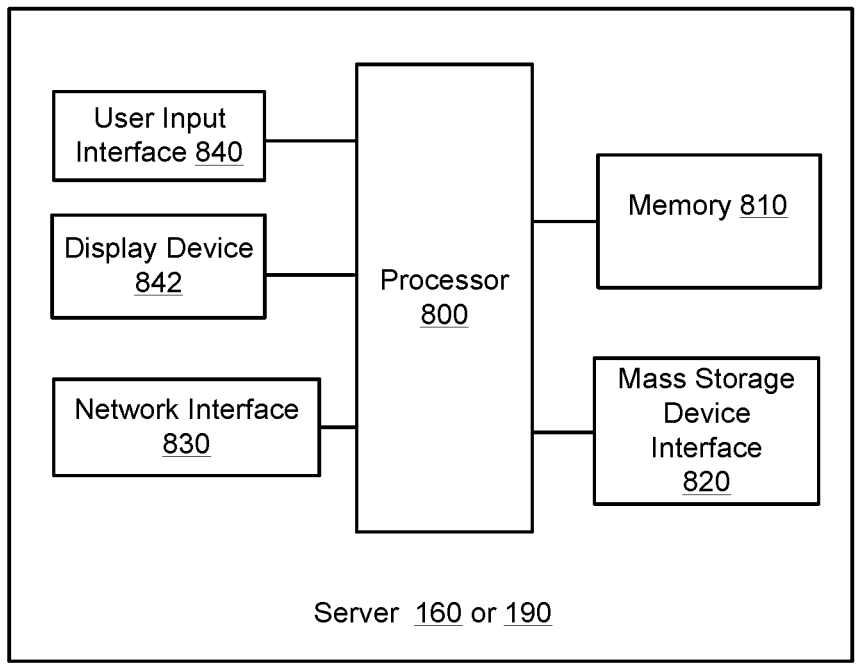
FIG. 8 is a block diagram of a server configured to operate according to some embodiments of the present disclosure.

FIG. 8 is a block diagram of a server configured to operate according to some embodiments of the present disclosure. The server may be configured to operate as the ground based server 190, the aircraft based server 160, and/or the vehicle based server disclosed herein. Referring to FIG. 8, the server 160 includes a processor 800, a memory 810, and a network interface 830 which may include a radio access network transceiver and/or a wired network interface (e.g., Ethernet interface). The network interface 830 is configured to communicate with user devices 110 and or other servers, including ground based server 190 or aircraft based server 160.

The processor 800 may include one or more data processing circuits, such as a general purpose and/or special purpose processor (e.g., microprocessor and/or digital signal processor) that may be collocated or distributed across one or more networks. The processor 800 is configured to execute computer program code in the memory 810, described below as a non-transitory computer readable medium, to perform at least some of the operations described herein as being performed by an access control computer. The computer program code when executed by the processor 800 causes the processor 800 to perform operations in accordance with one or more embodiments disclosed herein for the ground based server 190 and/or the aircraft based content server 160. The server may further include a mass storage device interface 820 (e.g., a connector), user input interface 840 (e.g., touch screen, keyboard, keypad, etc.), and a display device 842.

Figure 9:
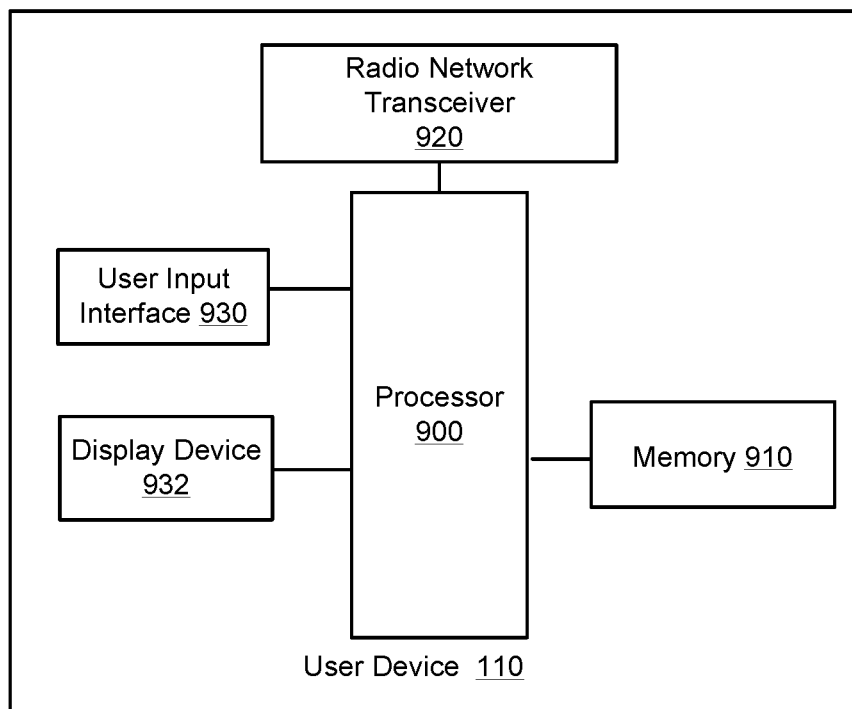
FIG. 9 is a block diagram of elements of a user device configured to operate in accordance with some embodiments of the present disclosure.

FIG. 9 is a block diagram of a user device 110 configured to operate according to some embodiments of the present disclosure. Referring to FIG. 9, the user device 110 includes a processor 900, a memory 910, and a radio network transceiver 920 which can include, but is not limited to, a LTE or other cellular transceiver, WLAN transceiver (IEEE 802.11), WiMax transceiver, or other radio communication transceiver or wired network interface (e.g., Ethernet and/or USB) configured to communicate with the ground based server 190 and/or the aircraft based server 160.

The processor 900 may include one or more data processing circuits, such as a general purpose and/or special purpose processor (e.g., microprocessor and/or digital signal processor) that may be collocated or distributed across one or more networks. The processor 900 is configured to execute computer program code in the memory 910, described below as a non-transitory computer readable medium, to perform at least some of the operations described herein as being performed by an access control computer. The computer program code when executed by the processor 900 causes the processor 900 to perform operations in accordance with one or more embodiments disclosed herein for the user device 110. The user device 110 may further include a user input interface 930 (e.g., touch screen, keyboard, keypad, etc.) and a display device 932.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an ISP) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A ground based server comprising:
 a repository storing internet session information for at least one user device located in a vehicle and having an onboard internet protocol address mapped to an internet protocol address for a vehicle based server;
 a network interface that communicatively interconnects the ground based server with a second server;
 at least one processor associated with the ground based server that is configured to:
 receive a request from the second server for a government identity of a user of the at least one user device having the onboard internet protocol address mapped to the internet protocol address for the vehicle based server;
 retrieve the government identity of the of the at least one user device from the repository based on the onboard internet protocol address mapped to the internet protocol address for the vehicle based server; and
 communicate the government identity of the user of the at least one user device to the second server to generate an internet connection authorization decision based on the government identity of the user.

2. The ground based server of claim 1, wherein the government identity
 identifies at least one of: a passport number, a name, a home mailing address, a birth date, a telephone number, and a government issued identifier for the user of the at least one user device.

3. The ground based server of claim 1, wherein the repository programmatically associates the government identity of the user of the at least one user device with the onboard internet protocol address for the at least one user device mapped to the internet protocol address for the vehicle based server.

4. The ground based server of claim 3, wherein the request includes at least one of: the onboard internet protocol address for the at least one user device, a vehicle identification number, and a travel identification number for a specified time period.

5. The ground based server of claim 3, wherein the at least one processor
 associated with the ground based server is further configured to:

receive a request for internet service originating from the at least one user device through a communication network, wherein the request includes travel information for the user of the at least one user device and the onboard internet protocol address of the at least one user device mapped to the internet protocol address of the second server;

generate the internet connection authorization decision based on use of the travel information to retrieve the government identity of the user from the travel information, wherein the internet connection authorization decision includes the onboard internet protocol address of the at least one user device mapped to the internet protocol address of the second server; and communicate the internet connection authorization decision to the second server.

6. The ground based server of claim 5, wherein the internet connection authorization decision includes a session token comprising internet session information for the at least one user device associated with the onboard internet protocol address of the at least one user device mapped to the internet protocol address for the second server.

7. The ground based server of claim 5, wherein the travel information comprises at least one of: a passenger name, a flight number, a passenger ticket number, and an airline frequent flyer membership number for the user of the at least one user device.

8. The ground based server of claim 5, wherein the at least one processor is associated with the ground based server is further configured to:

correlate the travel information of the user device to the government identity of the user device.

9. The ground based server of claim 8, wherein the at least one processor is associated with the ground based server is further configured to:

deny the user device internet service responsive to the travel information and government identity failing to correlate; and grant the user device internet service responsive to the travel information and the government identity being correlated.

10. The ground based server of claim 1, wherein the communication of the government identity of the user of the at least one user device to the second server comprises directing the communication of the government identity to an internet protocol address of the second server located on an aircraft.

11. A ground based server comprising:

a repository storing internet session information for at least one user device located in a vehicle and having an onboard internet protocol address mapped to an internet protocol address for a vehicle based server;

a network interface that communicatively interconnects the ground based server with a second server;

at least one processor associated with the ground based server that is configured to:

receive a request from the second server for internet subscription plan information of a user of the at least one user device having a government identity of the user previously validated by an issuer of the internet subscription pan and having the onboard internet protocol address mapped to the internet protocol address for the vehicle based server;

retrieve the internet subscription plan information of the user of the at least one user device from the repository based on the onboard internet protocol address mapped to the internet protocol address for the vehicle based server; and communicate the internet subscription plan information of the user of the at least one user device to the second server to generate an internet connection authorization decision based on the internet subscription plan having the government identity of the user previously validated by the issuer of the internet subscription plan.

12. The ground based server of claim 11, wherein the internet subscription plan information includes at least one of: an internet subscription plan identity, a mobile telephone number, and login credentials for the user of the at least one user device.

13. The ground based server of claim 11, wherein the repository programmatically associates the internet subscription plan information of the user of the at least one user device with the onboard internet protocol address for the at least one user device mapped to the internet protocol address for the vehicle based server.

14. The ground based server of claim 13, wherein the at least one processor associated with the ground based server is further configured to:

receive a request for internet service originating from the at least one user device through a communication network, wherein the request includes the onboard internet protocol address of the at least one user device mapped to the internet protocol address of the second server;

generate an internet connection authorization decision, wherein the internet connection authorization decision includes the onboard internet protocol address of the at least one user device mapped to the internet protocol address of the second server; and communicate the internet connection authorization decision to the second server.

15. The ground based server of claim 14, wherein the internet connection authorization decision includes a session token comprising internet session information for the at least one user device associated with the onboard internet protocol address of the at least one user device mapped to the internet protocol address for the second server.

16. The ground based server of claim 14, wherein the at least one processor is associated with the ground based server is further configured to:

validate the internet subscription plan information of a user of the at least one user device.

17. The ground based server of claim 16, wherein the at least one processor is associated with the ground based server is further configured to:

deny the user device internet service responsive to the internet subscription plan information failing to validate; and grant the user device internet service responsive to the internet subscription plan information being validated.

18. The ground based server of claim 11, wherein the communication of the internet subscription plan information of the user of the at least one user device to the second server comprises directing the communication of the internet subscription plan information to an internet protocol address of the second server located on an aircraft.

* * * * *